(12) United States Patent
Soule (10) Patent No.: US 8,801,383 B2
(45) Date of Patent: Aug. 12, 2014

(54) BALL BEARING RETENTION FOR PROPELLER BLADE AND METHOD OF ASSEMBLY

(75) Inventor: Matthew C. Soule, Granby, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 422 days.

(21) Appl. No.: 13/172,302

(22) Filed: Jun. 29, 2011

(65) Prior Publication Data

US 2013/0004318 A1    Jan. 3, 2013

(51) Int. Cl.
B64C 11/06 (2006.01)

(52) U.S. Cl.
USPC .................................. 416/204 R; 416/244 A (58) Field of Classification Search
USPC ...... 416/204 R, 205–209, 174, 244 R, 244 A; 384/499, 500, 504, 512, 517, 519, 542, 384/487, 516, 507, 508; 29/889, 889.6, 29/281.4
See application file for complete search history.

(56) References Cited

U.S. PATENT DOCUMENTS

| | | | | |
|---|---|---|---|---|
| 1,587,184 A | * | 6/1926 | Riebe | ............................ 384/516 |
| 3,490,537 A | * | 1/1970 | Quenneville | .................. 416/174 |
| 6,015,264 A | * | 1/2000 | Violette et al. | ............ 416/146 A |
| 6,524,008 B1 | * | 2/2003 | Yatabe et al. | .................. 384/450 |
| 6,827,496 B2 | * | 12/2004 | Iwata et al. | ..................... 384/516 |
| 7,325,974 B2 | * | 2/2008 | Tanabe et al. | .................. 384/486 |
| 7,448,806 B2 | * | 11/2008 | Ishiguro et al. | ............... 384/417 |
| 2001/0028754 A1 | * | 10/2001 | Ishiguro et al. | ............... 384/516 |
| 2003/0059142 A1 | * | 3/2003 | Shirokoshi et al. | ........... 384/516 |
| 2009/0220344 A1 | * | 9/2009 | Pfeiffer et al. | ............. 416/219 A |

FOREIGN PATENT DOCUMENTS

| | | |
|---|---|---|
| DE | 102010002748 A1 | 9/2011 |
| GB | 499932 A | 1/1939 |
| GB | 811177 A | 4/1959 |
| GB | 2229499 A | 9/1990 |
| GB | 2448649 | 3/2011 |
| JP | 2002005178 A | 1/2002 |
| WO | WO 2007136367 A1 * | 11/2007 |

* cited by examiner

*Primary Examiner* — Edward Look
*Assistant Examiner* — William Grigos
(74) *Attorney, Agent, or Firm* — Cantor Colburn LLP (57) ABSTRACT

A propeller assembly includes a hub and a blade installed in the hub. A bearing arrangement retains the blade in the hub and includes an outer bearing race at the hub including a first outer race radius and a second outer race radius different from the first outer race radius, connected by an outer relief. The bearing arrangement further includes an inner bearing race at the blade including a first inner race radius and a second inner race radius different from the first inner race radius, connected by an inner relief. A plurality of bearing balls are installed between the inner race and outer race thereby retaining the blade at the hub.

16 Claims, 9 Drawing Sheets

BALL BEARING RETENTION FOR PROPELLER BLADE AND METHOD OF ASSEMBLY

BACKGROUND OF THE INVENTION

The subject matter disclosed herein relates to propellers. More specifically, the subject disclosure relates to blade retention systems for propellers.

Modern aircraft propellers use composite materials to produce lightweight blades capable of supporting certain operating loads. These operating loads can include a centrifugal force component which acts in a direction parallel to the longitudinal axis of the propeller blade. Historically, retention systems of non-preloaded propeller blades rely on the centrifugal load generated by the weight of the blade structure during operation to stiffen the blade retention system for load carrying capability, especially the steady and cyclic bending loads. As propeller blades have gotten lighter with the use of composite materials, the retention systems of non-preloaded propeller blades have been altered to provide the necessary load for stiffening of the blade retention. This alteration has resulted in large and heavy parts for retention mechanisms.

Many propeller blade retention systems address the problems associated with size and result in weight reduction. These systems use an assembly of bearings for retention of the propeller blade inside a hub assembly. Such a bearing arrangement retains the propeller blade from inside the hub and provides appropriate blade retention stiffness to reduce the amount of vibration.

However, this design does not provide means for preloading which is required by retention systems that include modern composite blades. Such arrangements which are known do not provide ease of replacement and maintenance of parts.

BRIEF DESCRIPTION OF THE INVENTION

A propeller assembly includes a hub and a blade installed in the hub. A bearing arrangement retains the blade in the hub and includes an outer bearing race at the hub including a first outer race radius and a second outer race radius different from the first outer race radius, connected by an outer relief. The bearing arrangement further includes an inner bearing race at the blade including a first inner race radius and a second inner race radius different from the first inner race radius, connected by an inner relief. A plurality of bearing balls are installed between the inner race and outer race thereby retaining the blade at the hub.

A method of installing a propeller blade to a propeller assembly includes inserting a propeller blade into a hub opening of a propeller hub and aligning an inner bearing race located at the propeller blade with an outer bearing race located at the hub. The method further includes installing a plurality of bearing balls through a bearing port and between the inner race and outer race thus retaining the propeller blade at the hub.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
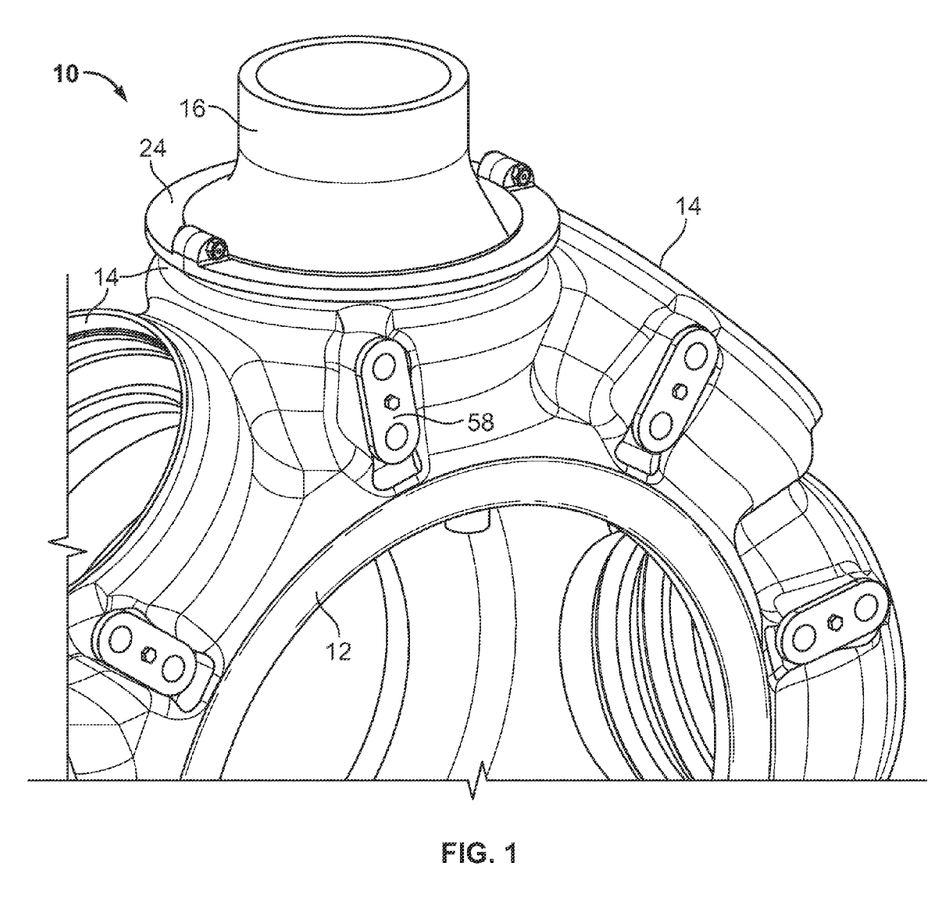
FIG. 1 is a partial perspective view of an embodiment of a propeller assembly.

Shown in FIG. 1 is an embodiment of a propeller assembly 10. The assembly 10 includes a hub 12 including a plurality of hub openings 14, each hub opening 14 configured to receive a propeller blade 16 which is to be retained therein.

Figure 2:
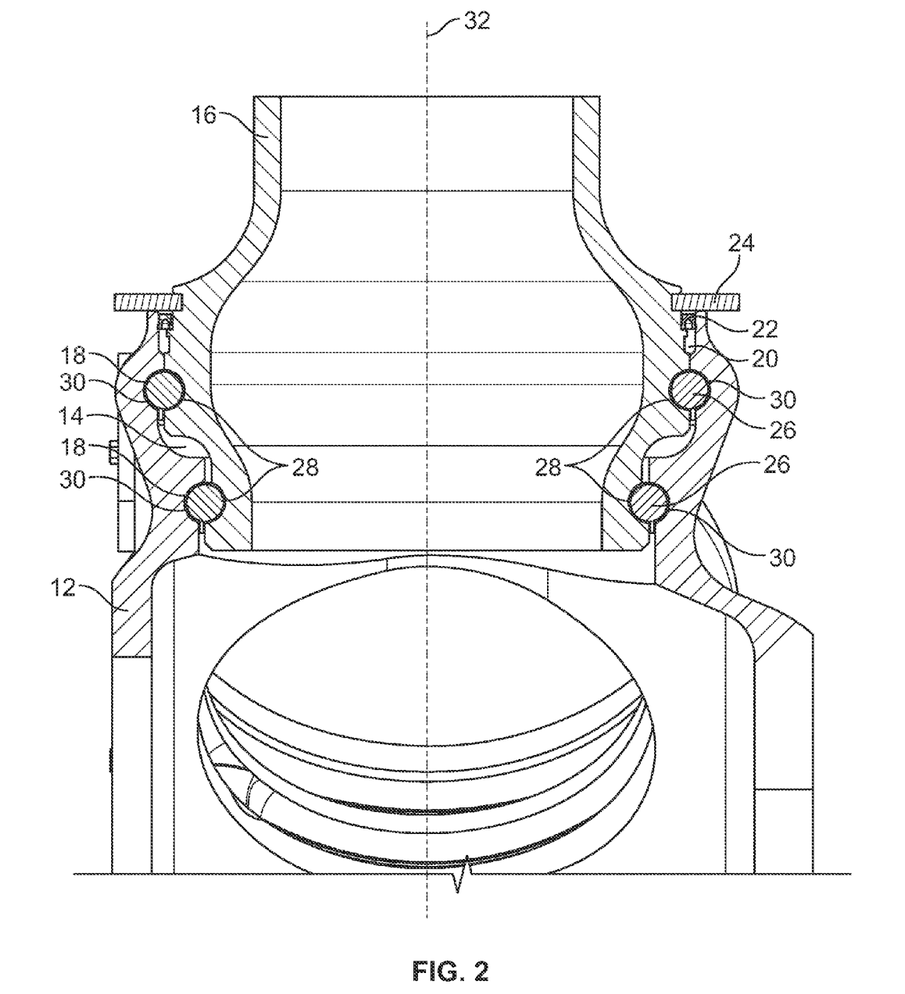
FIG. 2 is a cross-sectional view of an embodiment of a blade retention scheme for a propeller assembly.

Referring now to FIG. 2, the blade 16 is retained in the hub opening 14 by one or more bearings 18. The embodiment of FIG. 2 illustrates two bearings 18, but it is to be appreciated that embodiments may include other numbers of bearings 18, for example, one or three bearings 18. The assembly also includes a blade seal 20 and backup ring 22 that are located at an interface between the blade 16 and the hub opening 14 to prevent lubricant from leaking from the bearings 18, and to prevent contamination of the bearings 18. Finally, a blade seal support ring 24 is installed over the blade seal 20 and backup ring 22 to retain those components in the hub opening 14.

Referring again to FIG. 2, the bearings 18, include a bearing necklace retaining a plurality of bearing balls 26 and located between an inner race 28, or inner groove, in the blade 16, and an outer race 30, or outer groove, at the hub 12. The bearings 18 retain the blade 16 in an axial direction along a blade axis 32 to retain the blade 16 within the hub 12 while still allowing blade 16 rotation about the blade axis 32 (blade pitch change).

Figure 3:
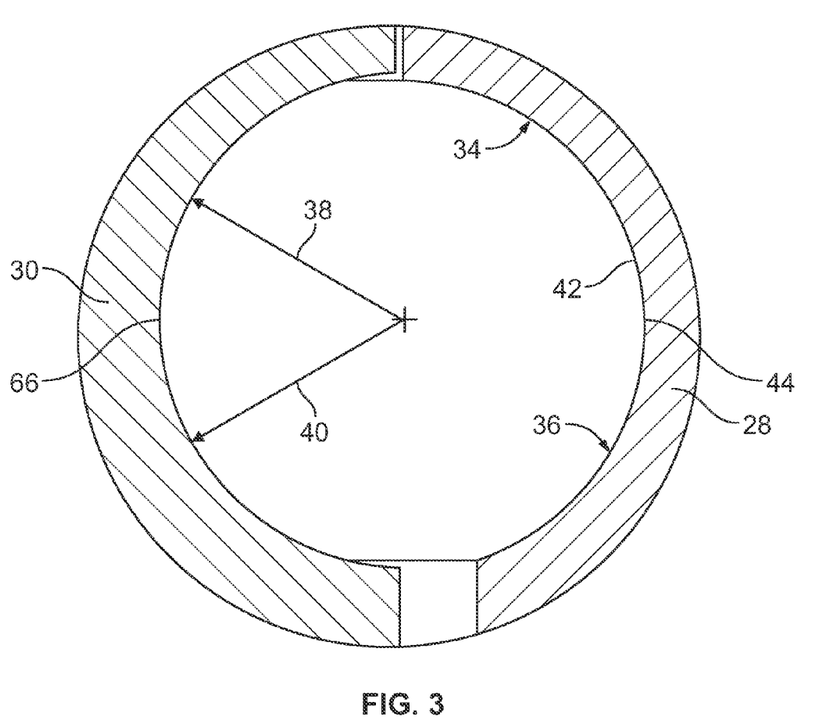
FIG. 3 is a cross-sectional view of an inner and outer bearing race of a blade retention scheme for a propeller assembly.
Figure 4:
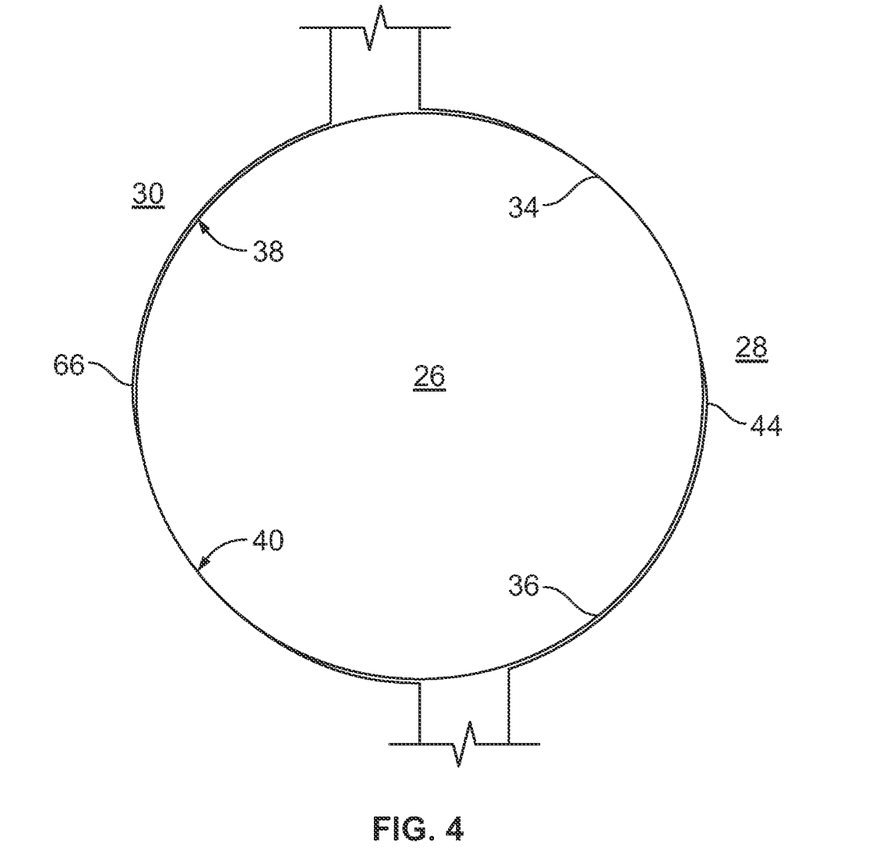
FIG. 4 is another cross-sectional view of an inner and outer bearing race of a blade retention scheme for a propeller assembly.

Referring now to FIG. 3, the inner race 28 and the outer race 30 are configured with multiple radii that together form a configuration sometimes referred to as a "gothic arch". For example, the inner race 28 includes a first inner radius 34 and a second inner radius 36, which differs from the first inner radius 34. Further, the first inner radius 34 and second inner radius 36 do not share a center point; centers of the two radii are offset. Similarly, the outer race 30 includes a first outer radius 38 and a second outer radius 40, which differs from the first outer radius 38. The first outer radius 38 and second outer radius 40 also have offset center points. The radii 34, 36, 38, 40 are configured to provide some clearance for the bearing necklace 26 (FIG. 4) inserted therein, but the clearance is minimized to provide retention of the blade 16 in the hub 12. For example, as shown in FIG. 4, in some embodiments, nominal clearance between the bearing ball 26 and the inner race 28 is about 0.003" (76.2 micrometers), with a similar clearance between the bearing ball 26 and the outer race 30.

Referring again to FIG. 3, the first inner radius 34 and the second inner radius 36 converge at an outer convergence point 42. To avoid a high stress concentration such a convergence point 42 results in, an inner relief 44 is provided between the first inner radius 34 and the second inner radius 36. The inner relief 44 also avoids high contract stresses by forcing the bearing ball 26 (FIG. 4) to bridge across the first inner radius 34 and second inner radius 36, rather than contacting at the convergence point 42. Similarly, the outer race 30 includes an outer relief 66 between the first outer radius 38 and the second outer radius 40.

Figure 5:
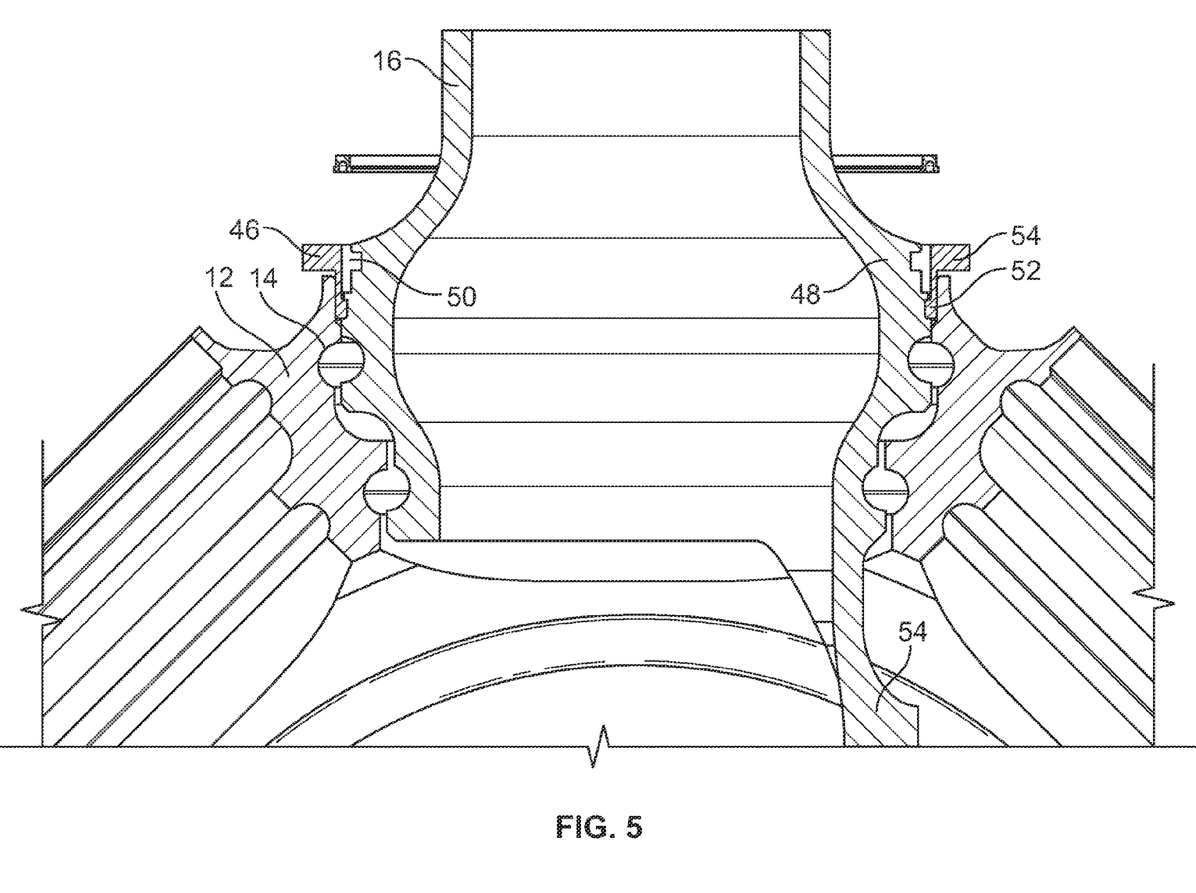
FIG. 5 is a cross-sectional view of an embodiment of a propeller blade being installed into a hub opening.
Figure 6:
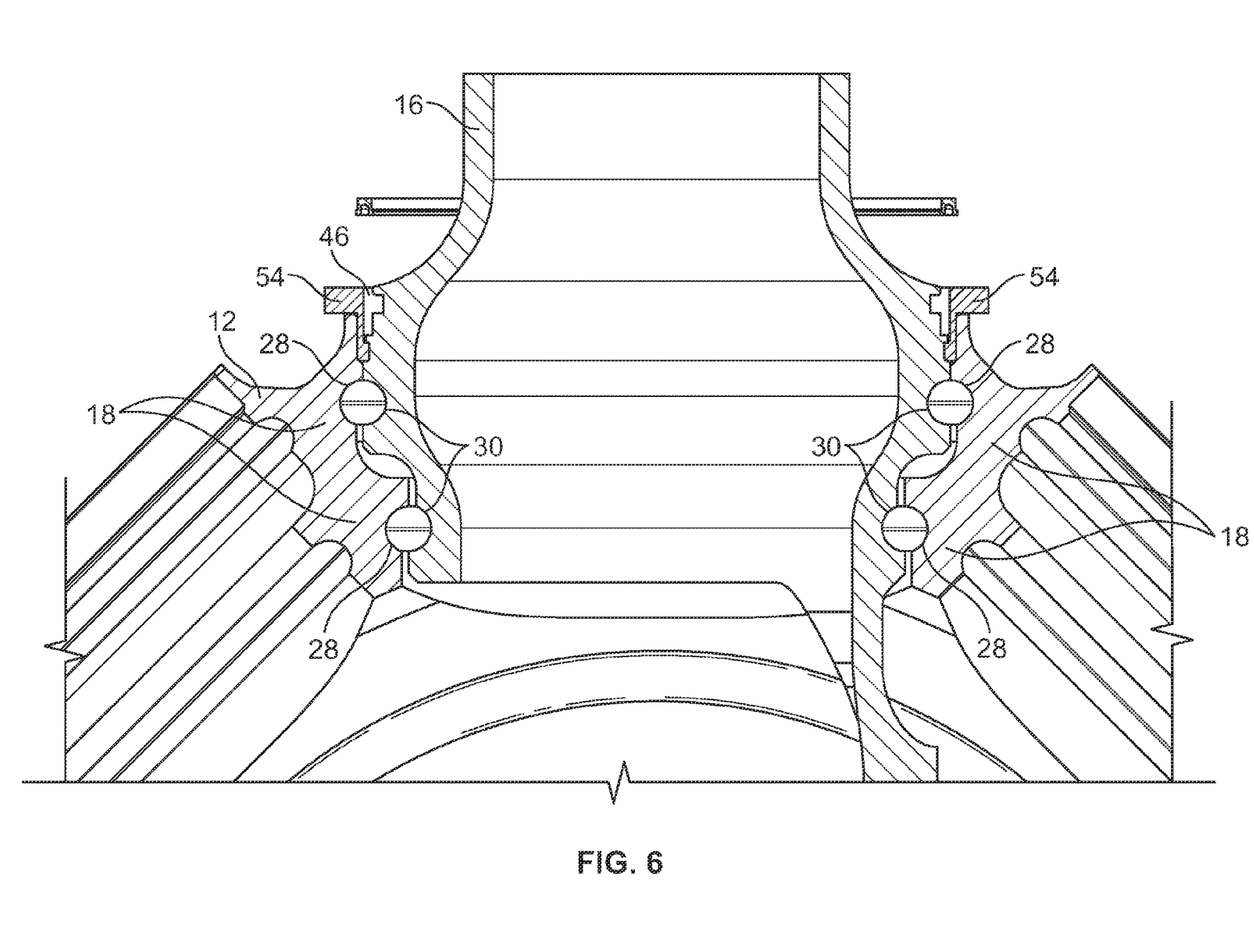
FIG. 6 is a cross-sectional view of a propeller blade inserted into a hub opening.

Referring now to FIG. 5, a method of installing the blade 16 to the hub 12 is now described. A blade support tool 46 is installed on a blade collar 48 and locked into position by aligning one or more tool bayonets 50 of the blade support tool 46 with one or more complimentary blade bayonets 52 of the blade collar 48. A blade pin 54 is aligned with the hub opening 14, and the blade 16 is inserted into the hub opening 14. In some embodiments, the installation operation is performed with the blade 16 in a substantially vertical orientation. Referring to FIG. 6, the blade support tool 46 includes one or more support tabs 54 extending into contact with the hub 12 to support the blade 16 in the hub opening 14. At this point the inner race 28 and the outer race 30 of each bearing 18 are in alignment.

Figure 7:
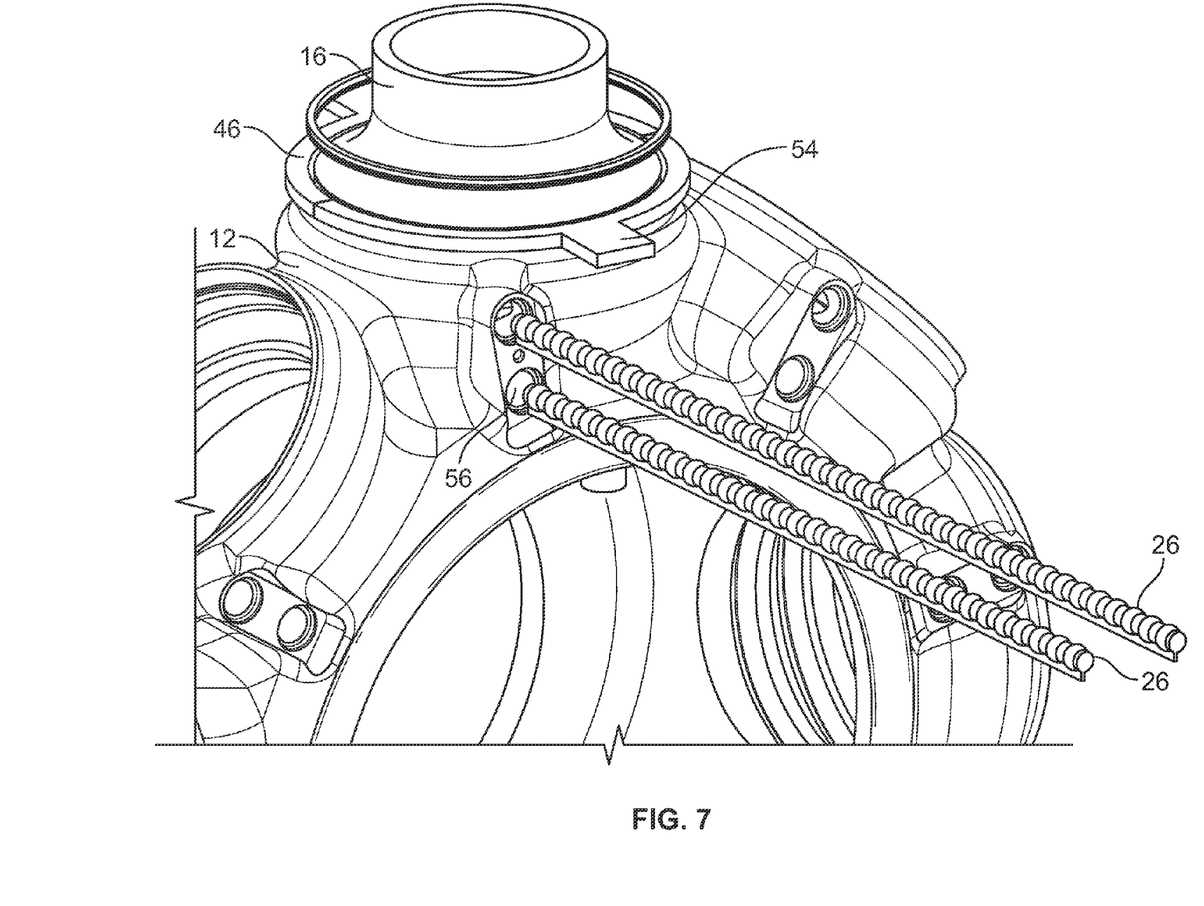
FIG. 7 is a view of a bearing necklace being installed into a propeller assembly.
Figure 8:
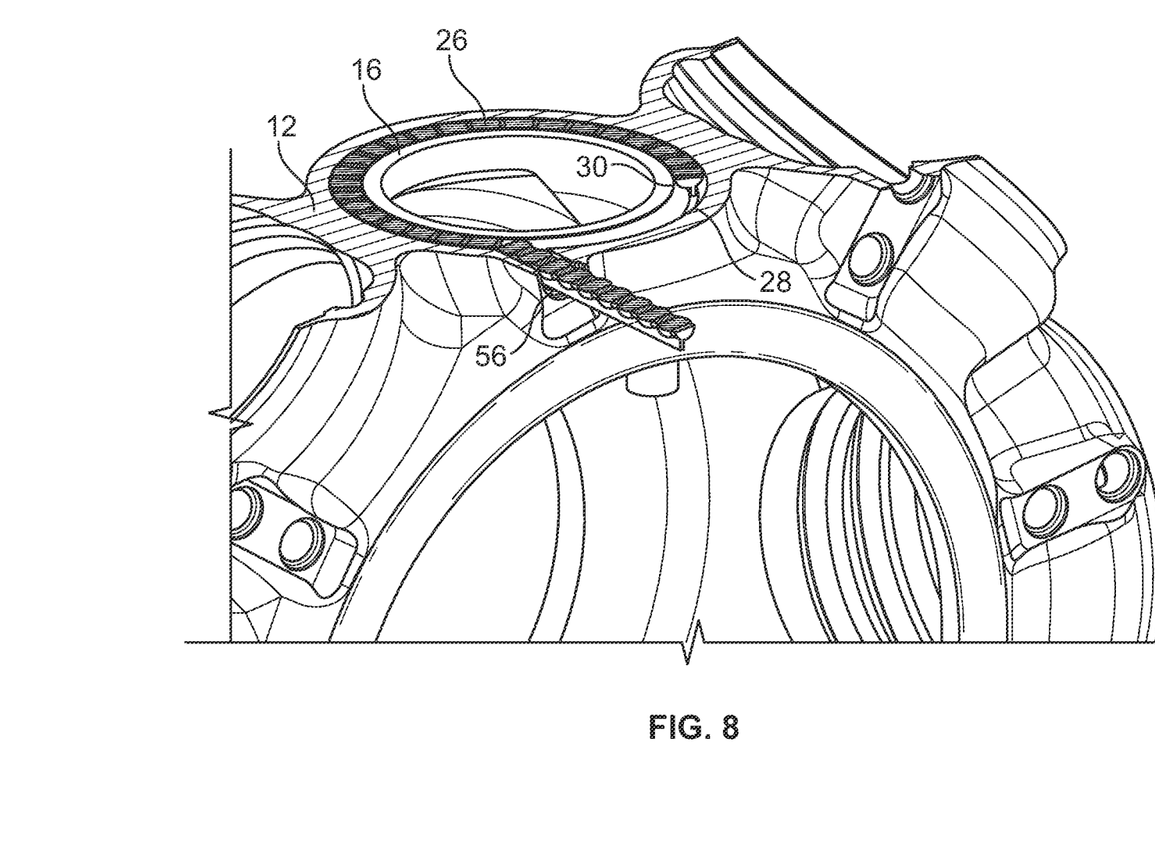
FIG. 8 is a view of a bearing necklace partially installed into a propeller assembly.
Figure 9:
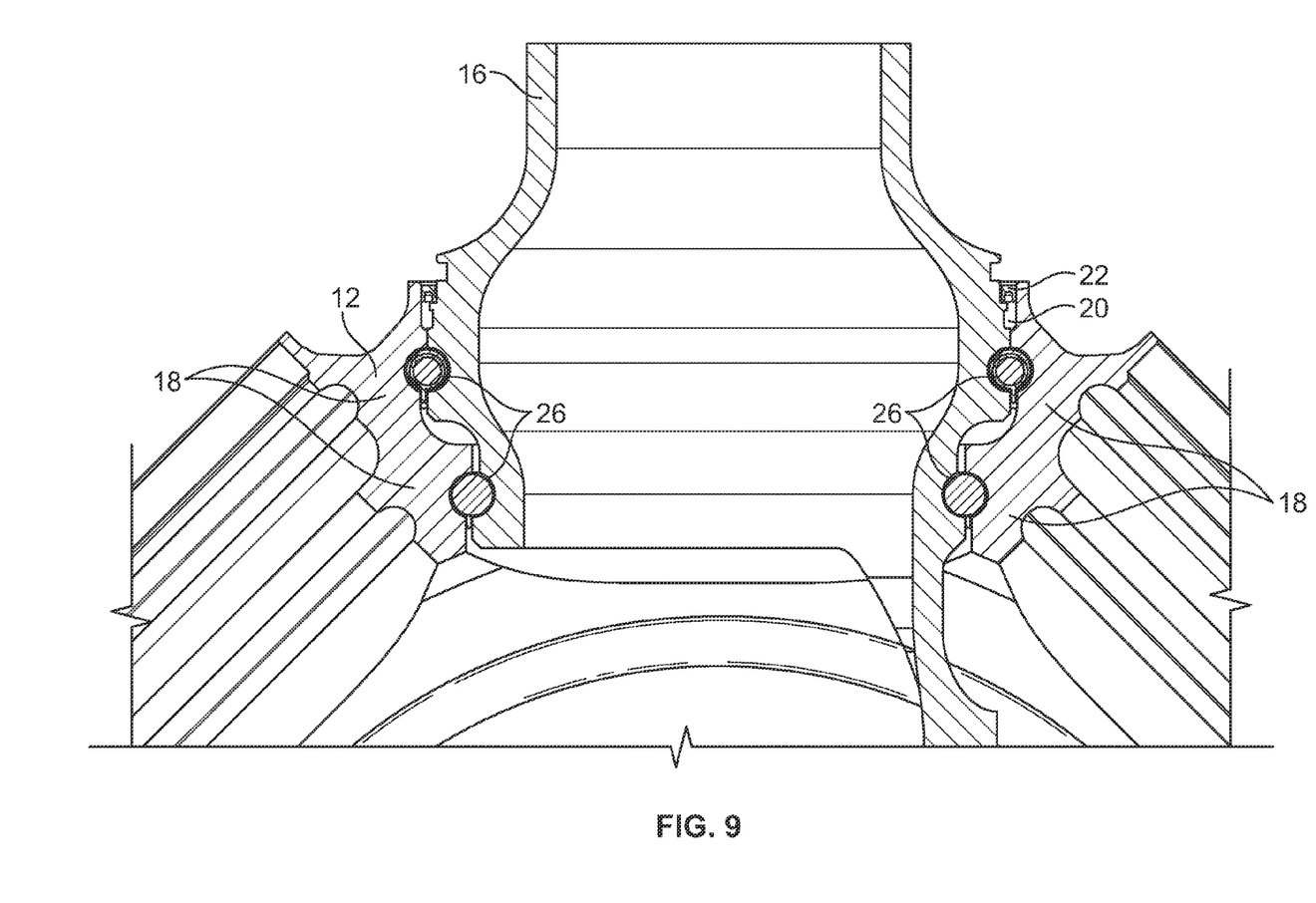
FIG. 9 is a cross-sectional view of a propeller assembly with a bearing necklace installed therein.

Referring to FIGS. 7 and 8, the hub 12 includes a bearing port 56 at each bearing 18, which may include a port cover 58 (shown in FIG. 1). The port cover 58 is removed and the bearing balls 26 are inserted between the inner race 28 and outer race 30. Once the bearing balls 26 are in place, the port cover 58 is reinstalled. As shown in FIG. 9, the blade support tool 46 is removed, and the blade 16 is now retained in the hub 12 by the bearings 18. The blade seal 20, backup ring 22 and seal support ring 24 are then installed.

Removal of the blade 16 from the hub 12 is accomplished by merely reversing the above sequence of operations. Once the blade 16 is removed from the hub 12, inspection and/or rework can be performed on the inner race 28 and/or outer race 30 due to wear on the surfaces throughout the life of the assembly. The inner race 28 and outer race 30 can be reworked by removing a desired amount of material therefrom via machining, grinding, or other operation. Once the material is removed, the blade 16 may be reinstalled in the hub 12 via the above process, but in some embodiments with bearing necklaces having larger diameter bearing balls 26, depending on the amount of material removed via the rework.

The blade 16 retention scheme described herein increases load capacity for a given bearing size over standard non-preloaded bearings, thereby allowing for a reduction in bearing size which results in a reduction of total propeller weight. Further, the blades 16 are easily individually removed and/or replaced in service, due at least in part to reduction in part count and complexity. Also, the bearing race surfaces are completely repairable to remove surface wear and damage thereby extending their useful life.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller assembly comprising:
    a hub;
    a blade installed in the hub; and
    a bearing arrangement to retain the blade in the hub, the bearing arrangement including:
        an outer bearing race at the hub including a first outer race radius extending from a first outer race end and a second outer race radius different from the first outer race radius extending from a second outer race end, connected by an outer relief;
        an inner bearing race at the blade including a first inner race radius extending from a first inner race end and a second inner race radius different from the first inner race radius extending from a second inner race end, connected by an inner relief; and
        a plurality of bearing balls installed between the inner race and outer race thereby retaining the blade at the hub.

2. The propeller assembly of claim 1, wherein the first outer race radius and the second outer race radius do not share a common center point.

3. The propeller assembly of claim 1, wherein the first inner race radius and the second inner race radius do not share a common center point.

4. The propeller assembly of claim 1, wherein a maximum clearance between the bearing balls and the inner race and between the bearing balls and the outer race is about 0.003".

5. The propeller assembly of claim 1, further comprising at least two bearing arrangements.

6. The propeller assembly of claim 1, further comprising a port cover removable from a bearing necklace installation port to allow for installation and removal of the bearing balls.

7. The propeller assembly of claim 1, further comprising a blade seal inserted in a hub opening between the blade and the hub.

8. The propeller assembly of claim 7, further comprising a seal retaining ring to retain the blade seal in the hub opening.

9. A method of installing a propeller blade to a propeller assembly comprising:
    affixing a blade support tool to a propeller blade;
    inserting the propeller blade into a hub opening of a propeller hub;
    bringing a portion of the blade support tool into contact with the propeller hub, thereby aligning an inner bearing race located at the propeller blade with an outer bearing race located at the propeller hub; and
    installing a plurality of bearing balls through a bearing port and between the inner race and outer race thus retaining the propeller blade at the propeller hub;
    wherein affixing the blade support tool to the propeller blade comprises aligning one or more blade bayonets with one or more tool bayonets.

10. The method of claim 9, further comprising installing a port cover over the bearing port once the bearing balls are installed.

11. The method of claim 9, further comprising installing a blade seal in the hub opening between the propeller hub and the propeller blade.

12. The method of claim 11, further comprising installing a seal retaining ring over the blade seal to retain the blade seal in the hub opening.

13. The method of claim 9, wherein an outer bearing race includes a first outer race radius and a second outer race radius different from the first outer race radius, connected by an outer relief.

14. The method of claim 13, wherein the first outer race radius and the second outer race radius do not share a common center point.

15. The method of claim 9, wherein an inner bearing race includes a first inner race radius and a second inner race radius different from the first inner race radius, connected by an inner relief.

16. The method of claim 15, wherein the first inner race radius and the second inner race radius do not share a common center point.

\* \* \* \* \*